US008222820B2

(12) United States Patent
Wang et al.

(10) Patent No.: US 8,222,820 B2
(45) Date of Patent: Jul. 17, 2012

(54) LED LAMP WITH REPLACEABLE LIGHT UNIT

(75) Inventors: Chun-Yuan Wang, Tainan Hsien (TW);
Shu-Hsien Wu, Tainan Hsien (TW);
Ching-Wen Wu, Tainan Hsien (TW);
Tsai-Yi Yang, Tainan Hsien (TW)

(73) Assignee: Cirocomm Technology Corp., Tainan Hsien (TW)

( * ) Notice: Subject to any disclaimer, the term of this patent is extended or adjusted under 35 U.S.C. 154(b) by 213 days.

(21) Appl. No.: 12/844,426

(22) Filed: Jul. 27, 2010

(65) Prior Publication Data

US 2012/0025706 A1 Feb. 2, 2012

(51) Int. Cl.
*H01K 1/62* (2006.01)

(52) U.S. Cl. .......... 315/32; 315/112; 362/294; 362/650; 313/46

(58) Field of Classification Search ............... 315/32, 315/35, 51, 112–113; 362/294, 800, 640, 362/647, 649–652; 313/45–47, 318.01, 318.09
See application file for complete search history.

(56) References Cited

U.S. PATENT DOCUMENTS

| | | | | |
|---|---|---|---|---|
| 6,948,829 B2 * | 9/2005 | Verdes et al. | | 362/227 |
| 7,226,189 B2 * | 6/2007 | Lee et al. | | 362/294 |
| 7,677,767 B2 * | 3/2010 | Chyn | | 362/294 |
| 7,965,023 B1 * | 6/2011 | Liang | | 313/45 |

* cited by examiner

*Primary Examiner* — James H Cho
(74) *Attorney, Agent, or Firm* — Chun-Ming Shih; HDLS IPR Services

(57) ABSTRACT

An LED lamp with replaceable light unit according to the invention includes a heat dissipation housing, a metal connector, a driver circuit board, a light unit slice, a pad and a shade. The heat dissipation housing has an opening at one end and a joint portion at another end. The metal connector is disposed to the joint portion of the heat dissipation housing. The driver circuit board disposed inside the heat dissipation housing to electrically connect with metal connector. The light unit slice and the pad are disposed inside the opening, and the light unit slice is electrically connected with the driver circuit board. The shade is disposed inside the opening. The LED lamp with replaceable light unit can be realized by the assembly of the above elements according to the different preferred embodiment of the present invention.

4 Claims, 15 Drawing Sheets

LED LAMP WITH REPLACEABLE LIGHT UNIT

BACKGROUND OF THE INVENTION

1. Field of the Invention

The invention relates generally to a lamp, and in particular to a lamp with a replaceable light unit for mounting on a lighting.

2. Description of Prior Art

Light emitting diode (LED) has gradually replaced the traditional light bulb, due to its small size, lower power consumption and durability, and intensively used in traffic light signal, vehicle direction lights, flashlights, cell phones, lighting and large outdoor billboard.

So far the lamp structure used in the lighting is formed by mounting plural light-emitting diodes on a circuit board or substrate, and then disposing the substrate to the inside of a heat dissipation housing, and disposing a shade on the front end of the heat dissipation housing. In the most of LED lamp structure for sale in market, when LED chips on the light unit of a LED lamp internal structure are damaged, the damaged LED lamp is discarded and directly replaced with a new one. It is unable for users only to replace the light unit of a LED lamp so that the discarded LED lamps would worsen the problems of environmental protection, and also result in a consumption of resources and waste money.

SUMMARY OF THE INVENTION

Therefore, the main purpose of the present invention is to solve the above deficiencies of prior art. The present invention provides a LED lamp with a replaceable light unit.

To achieve the above purpose, the present invention provides a LED lamp with a replaceable light unit, comprising:

a heat dissipation housing having a plurality of annular fins on the outer surface of upper part, an opening at one end and a joint portion at another end, and the opening inside having a spacer with a hole and a screw thread portion; the heat dissipation housing having a chamber to communicate with the hole and the joint portion;

a metal connector disposed to the joint portion, the metal connector having an annular screw connection portion and a lamp head connected to thereto in insulation;

a driver circuit board disposed inside the chamber, the driver circuit board having two power input wires and two power output wires, one of the power input wire electrically connected to the screw connection portion, and the other power input wire electrically connected to the lamp head; the two power output wires being connected to a joint;

a light unit slice having a substrate with a slice shape made of aluminum, the substrate having a circuit board disposed on a surface thereof and insulated thereto, electrically connecting to at least one light emitting element and further including a welding area for electrically connecting to two power source wires; a through hole disposed on the substrate and the circuit board, through which the two power source wires pass, and a joint provided to connect two power source wires and inserted into the joint of the two power output wires of the driver circuit board so that the driver circuit board can transmit a driving signal to the light unit slice for lighting the light emitting elements;

a pad disposed on a surface of the substrate;

a shade disposed on the opening, the shade having a connecting portion thereon, and the connecting portion having a screw thread face on its outer surface for screwing to the screw thread portion of the opening.

With the replaceable light unit, the LED lamps may be reused without discarding in order to reach the purpose of environmental protection and cost savings.

DETAILED DESCRIPTION OF THE INVENTION

A preferred embodiment of the present invention will be described with reference to the drawings.

Figure 1A:
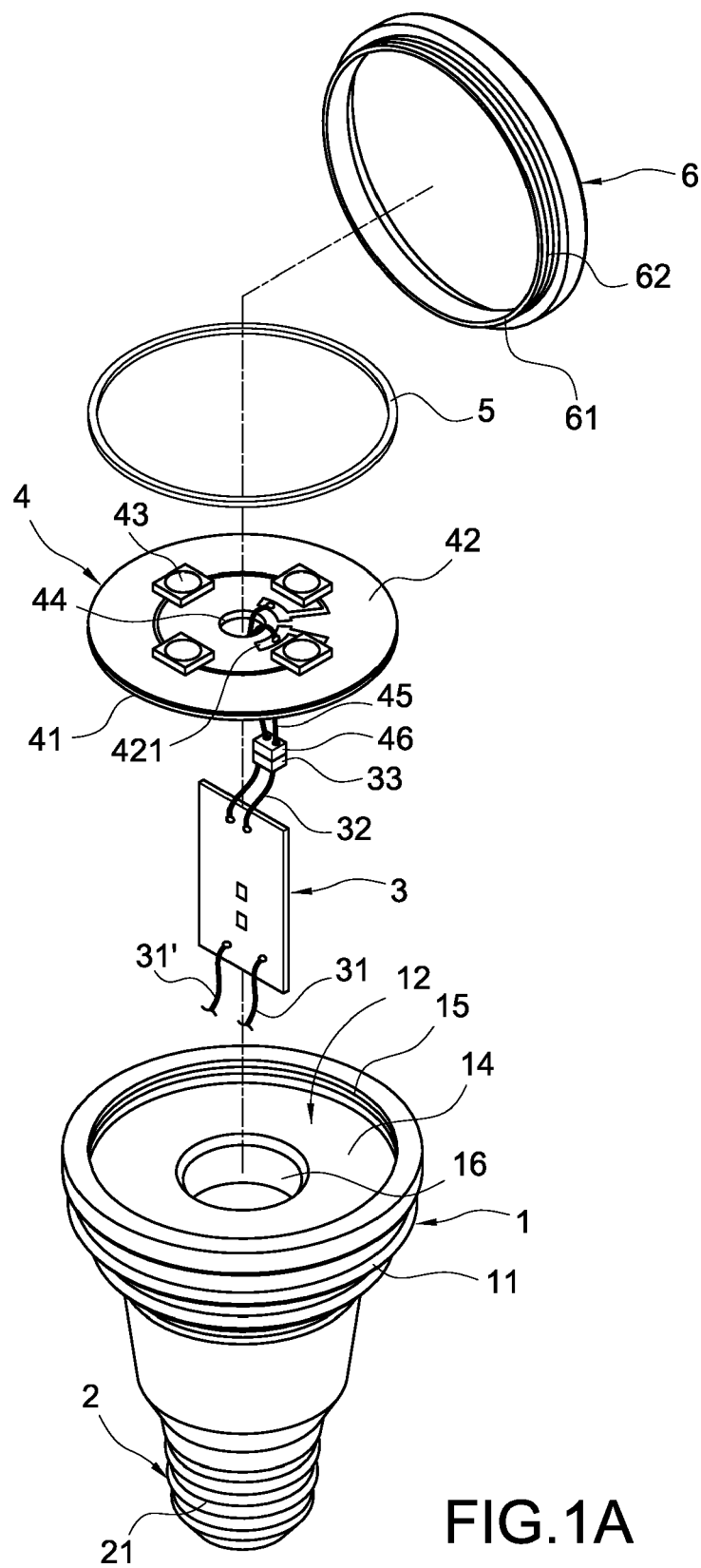
FIG. 1A shows an exploded view of LED lamp according to a first preferred embodiment of the present invention.
Figure 1B:
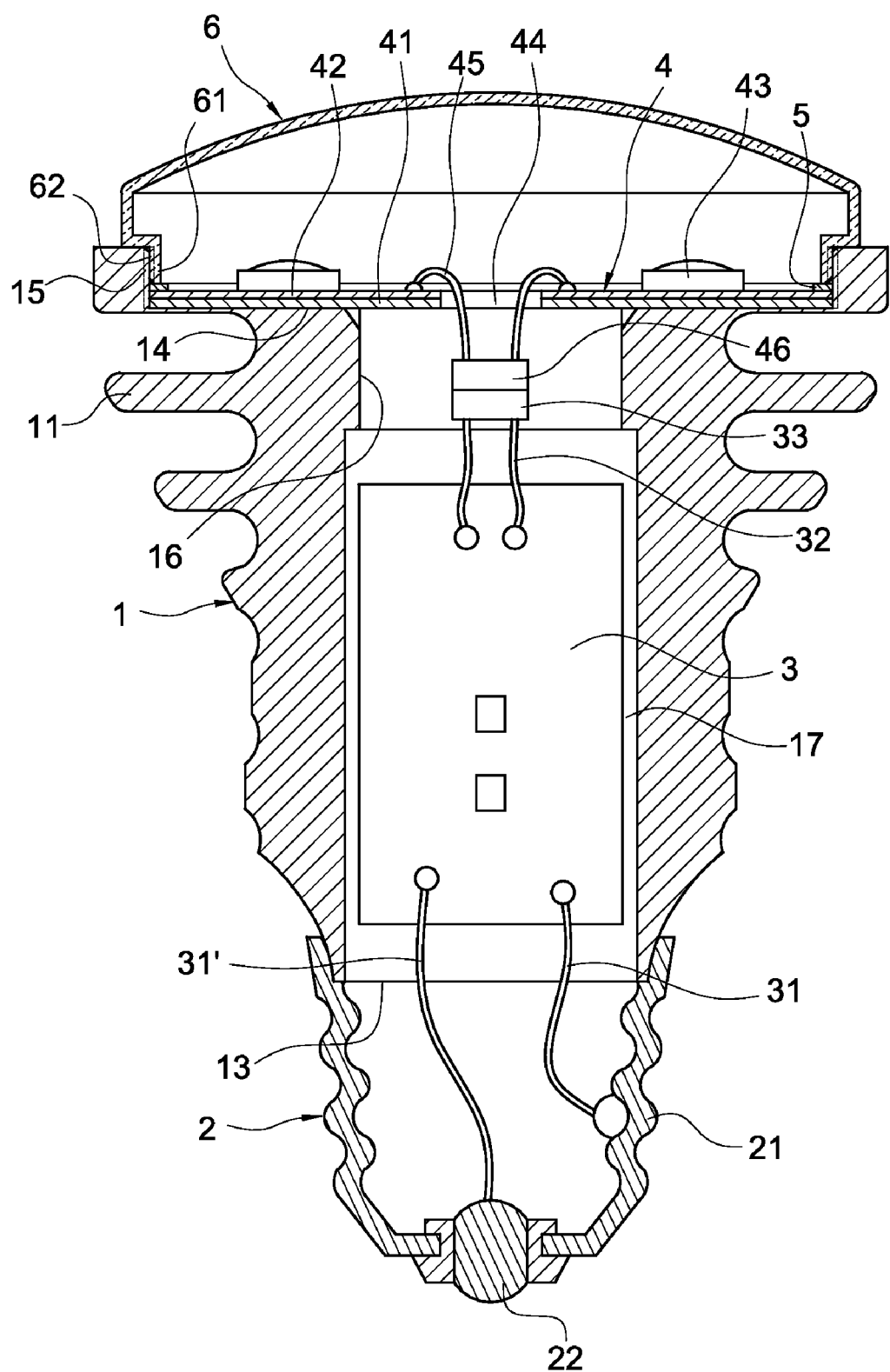
FIG. 1B shows schematically a cross section structure of FIG. 1A.

Please refer to FIGS. 1A and 1B, wherein FIG. 1A shows an exploded view of LED lamp according to a first preferred embodiment of the present invention and FIG. 1B shows schematically a cross section structure of FIG. 1A. As shown in the drawings, the LED lamp with a replaceable light unit according to the invention includes a heat dissipation housing 1, a metal connector 2, a driver circuit board 3, a light unit slice 4, a pad 5 and a shade 6.

The heat dissipation housing 1 is made of metal material (aluminum) and formed to be a cup-shape, and the heat dissipation housing 1 has plural annular fins 11 on the outer surface of upper part, an opening 12 at one end and a joint portion 13 at another end. The opening 12 inside has a spacer 14 having a hole 16 in the center and a screw thread portion 15. In addition, the heat dissipation housing 1 has a chamber 17 to communicate with the hole 16 and the joint portion 13.

The metal connector 2 is disposed to the joint portion 13 of the heat dissipation housing 1, and the metal connector 2 has an annular screw connection portion 21 and a lamp head 22 connected to thereto. Since the technology of metal connector 2 is well known, the detail is omitted herefrom.

The driver circuit board 3 is disposed inside the chamber 17 of the heat dissipation housing 1, and the driver circuit board 3 has two power input wires 31, 31' and two power output wires 32. The power input wire 31 electrically connects to the screw connection portion 21, and the power input wire 31' electrically connects to the lamp head 22. Furthermore, the two power output wires 32 connect to a joint 33.

The light unit slice 4 has a substrate 41 with a slice shape made of aluminum, and the substrate 41 has a circuit board 42 disposed on a surface thereof and insulated thereto, electrically connecting to at least one light emitting element 43 and further including a welding area 421 for electrically connecting to two power source wires 45. Moreover, a through hole 44 is disposed on the aluminum substrate 41 and the circuit board 42, and through which the two power source wires 45 pass. A joint 46 is provided to connect two power source wires 45 and insert into the joint 33 of the two power output wires 32 of the driver circuit board 3 so that the driver circuit board 3 can transmit a driving signal to the light unit slice 4 for lighting the light emitting elements 43. In the preferred embodiment, the light emitting elements 43 are LED.

The pad 5 is made of plastic material or rubber, which is annular. The pad 5 is disposed on a surface of the substrate 41.

The shade 6 is made of transparent plastic material and has a connecting portion 61 thereon. The connecting portion 61 has a screw thread face 62 on its outer surface for screwing to the screw thread portion 15 of the opening 12. Also, the bottom of connecting portion 61 may press on one surface of the substrate 41 to fasten the substrate 41 to the inside of the opening 12.

Please refer to FIG. 1B, which shows schematically a cross section structure of FIG. 1A. As shown in FIG. 1B, after assembling the metal connector 2, the driver circuit board 3, the light unit slice 4, the pad 5 and the shade 6 with the heat dissipation housing 1, the metal connector 2 may connect to a traditional lamp holder (not shown in the Figure) for lighting the LED lamp. When connecting the metal connector 2 to the lamp holder, the outer power source may flow through the lamp holder and the metal connector 2 to drive the driver circuit board 3 and light the light emitting element 43 on the light unit slice 4 through two power input wires 31, 31'. The ray produced from the light emitting element 43 may irradiate to outside through the shade 6.

When the light emitting element 43 of the light unit slice 4 is damaged, due to the design of screw connection of the shade 6 and the opening 12, users may replace the light unit slice 4 by screwing the shade 6 off the opening 12 and taking out the pad 5, and then disengaging the joint 46 of the two power source wires 45 of the substrate 41 and the joint 33 of the two power output wires 32. Therefore, a lamp can be reused without discarding in order to reach the environmental protection and cost savings.

Figure 2A:
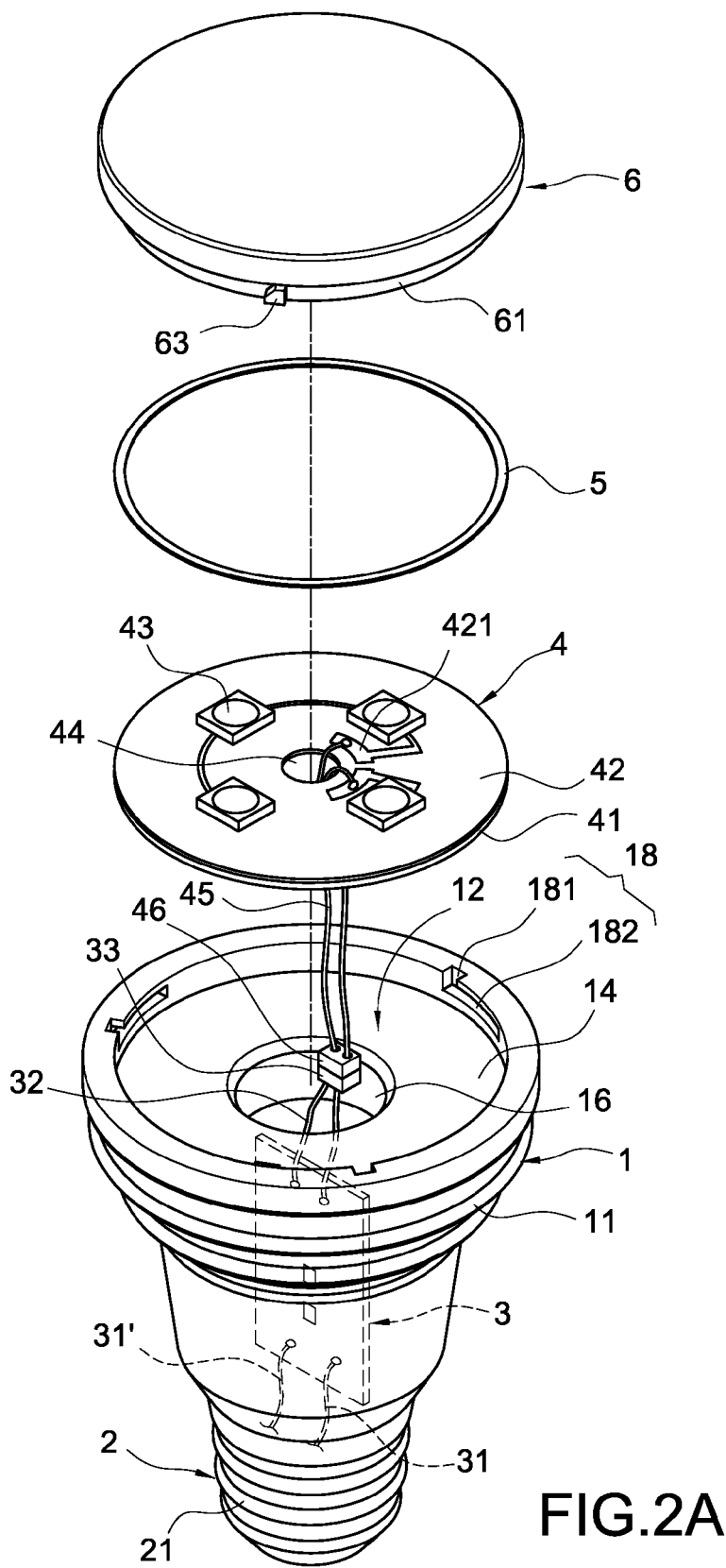
FIG. 2A shows an exploded view of LED lamp according to a second preferred embodiment of the present invention.

Please refer to FIG. 2A, which shows an exploded view of LED lamp according to a second preferred embodiment of the present invention. As shown in the figure, except that a plurality of wedges 63 are applied to replace the screw thread face 62 of the connecting portion 61 of the shade 6 and a plurality of slots 18 are applied to replace the screw thread portion 15 of the opening 12 of the heat dissipation housing 1 in this preferred embodiment, the other portions are substantially the same to that of FIGS. 1A and 1B. For example, the slot 18 is L-shape, having an inserting port 181 and a slide 182.

Figure 2B:
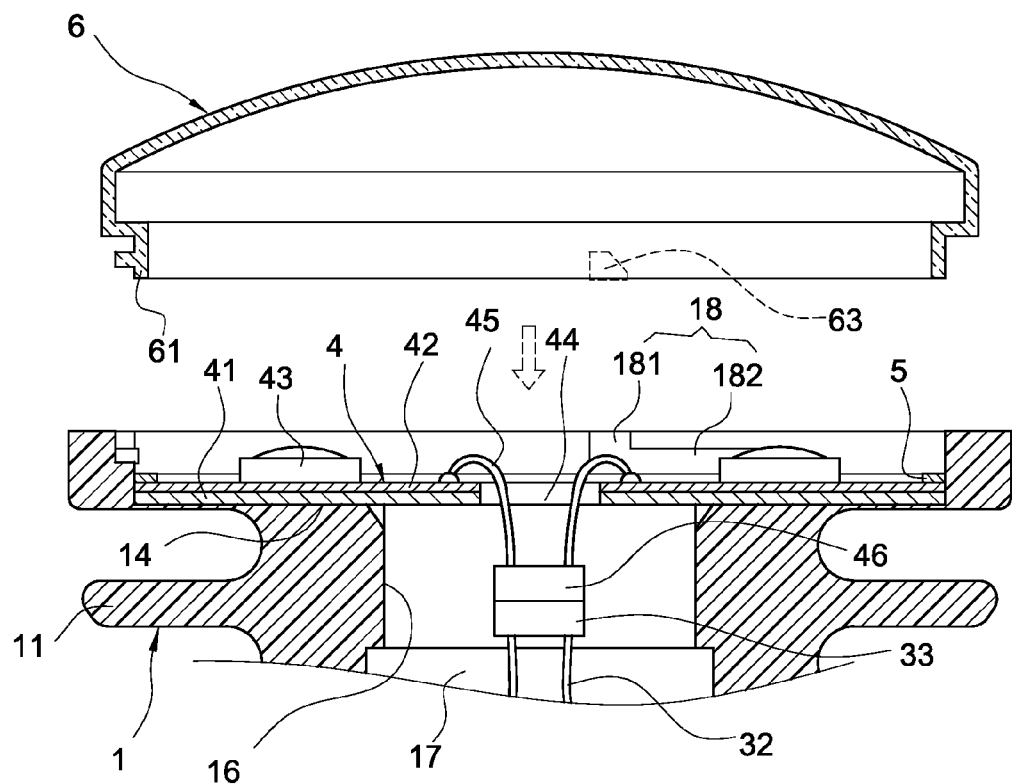
FIGS. 2B to 2D show schematically the connection action of the shade and the heat dissipation housing of FIG. 2A.
Figure 2C:
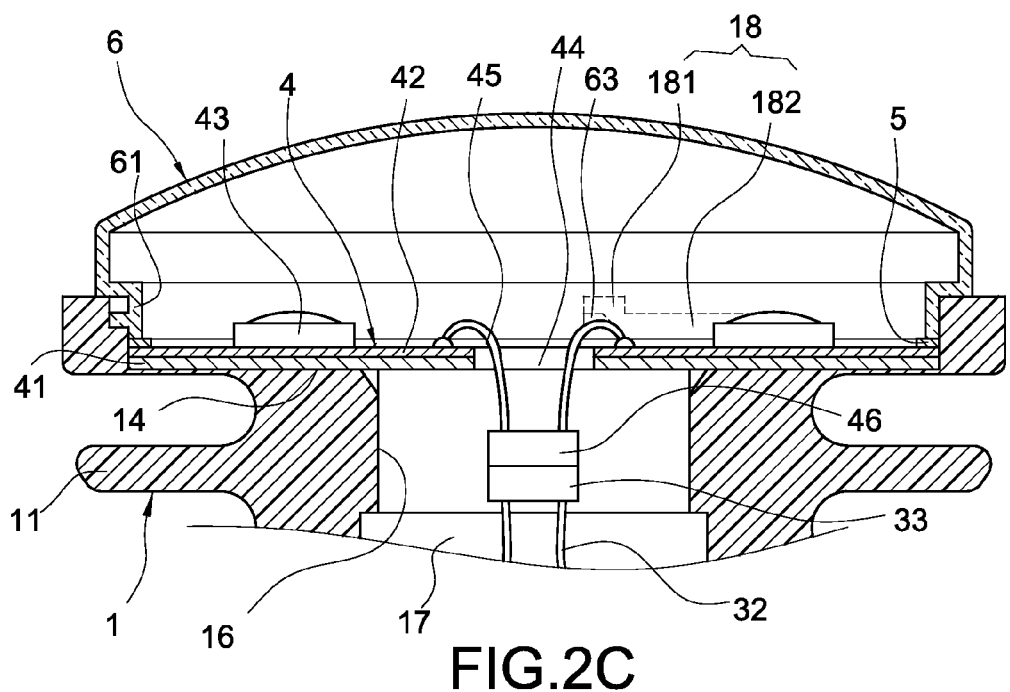
Figure 2D:
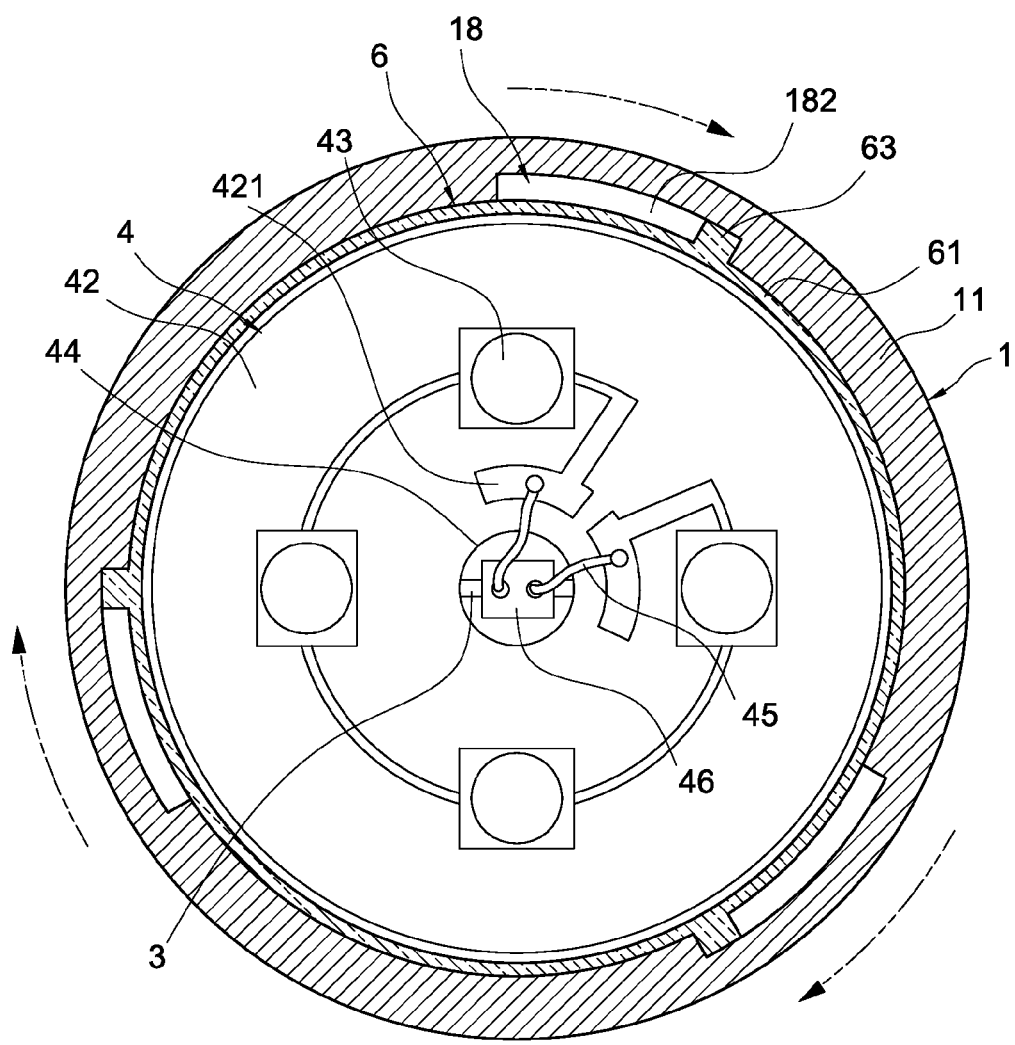

Please refer to FIGS. 2B to 2D, which show schematically the connection action of the shade 6 and the heat dissipation housing 1 of FIG. 2A. As shown in the figures, after assembling the metal connector 2, the driver circuit board 3, the light unit slice 4 and the pad 5 with the heat dissipation housing 1, the wedges 63 of the shade 6 are inserted into the inserting ports 181 of the slots 18, the shade 6 is rotated and the wedges 63 slide along the slides 182 to rapidly and easily connect the shade 6 with the opening 12 of the heat dissipation housing 1.

Figure 3A:
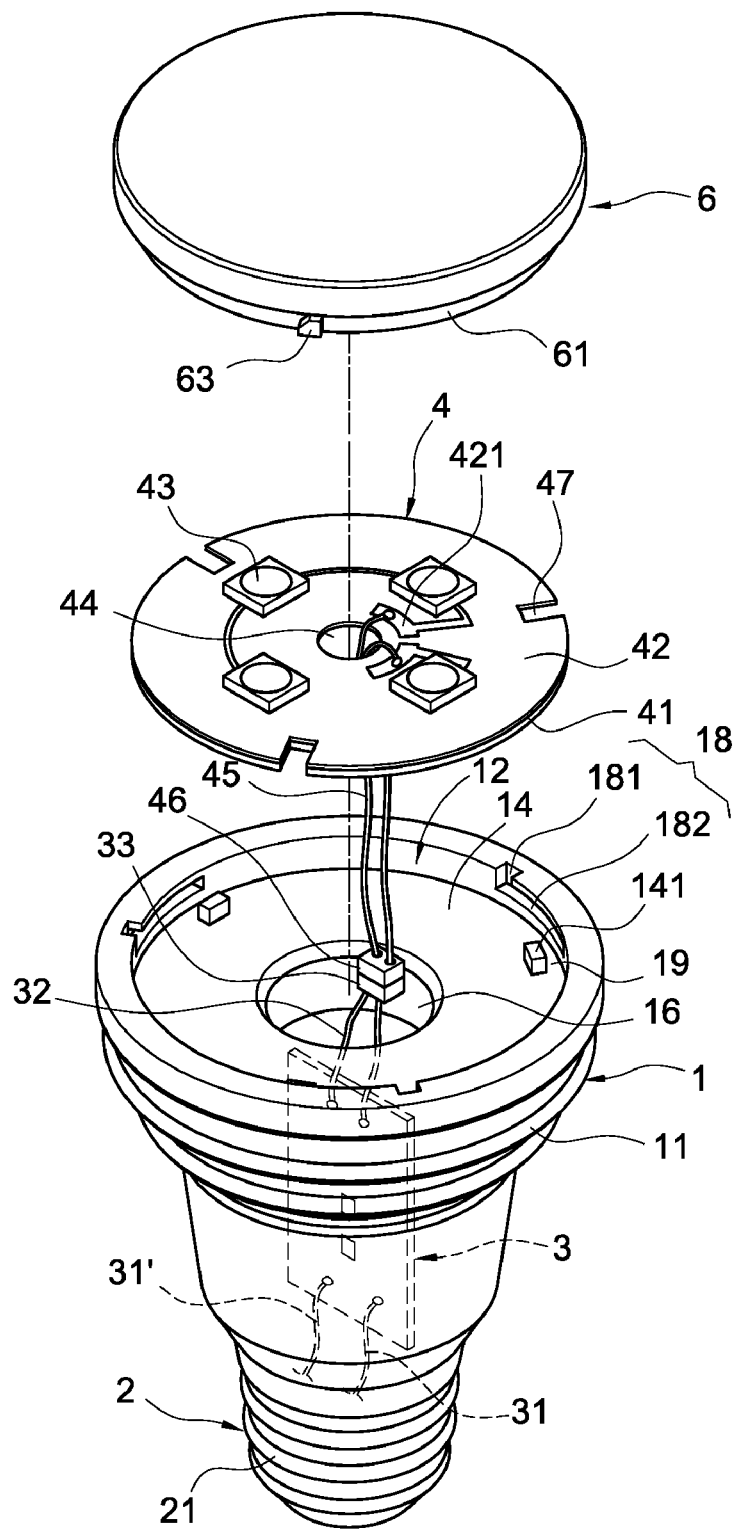
FIG. 3A shows an exploded view of LED lamp according to a third preferred embodiment of the present invention.
Figure 3B:
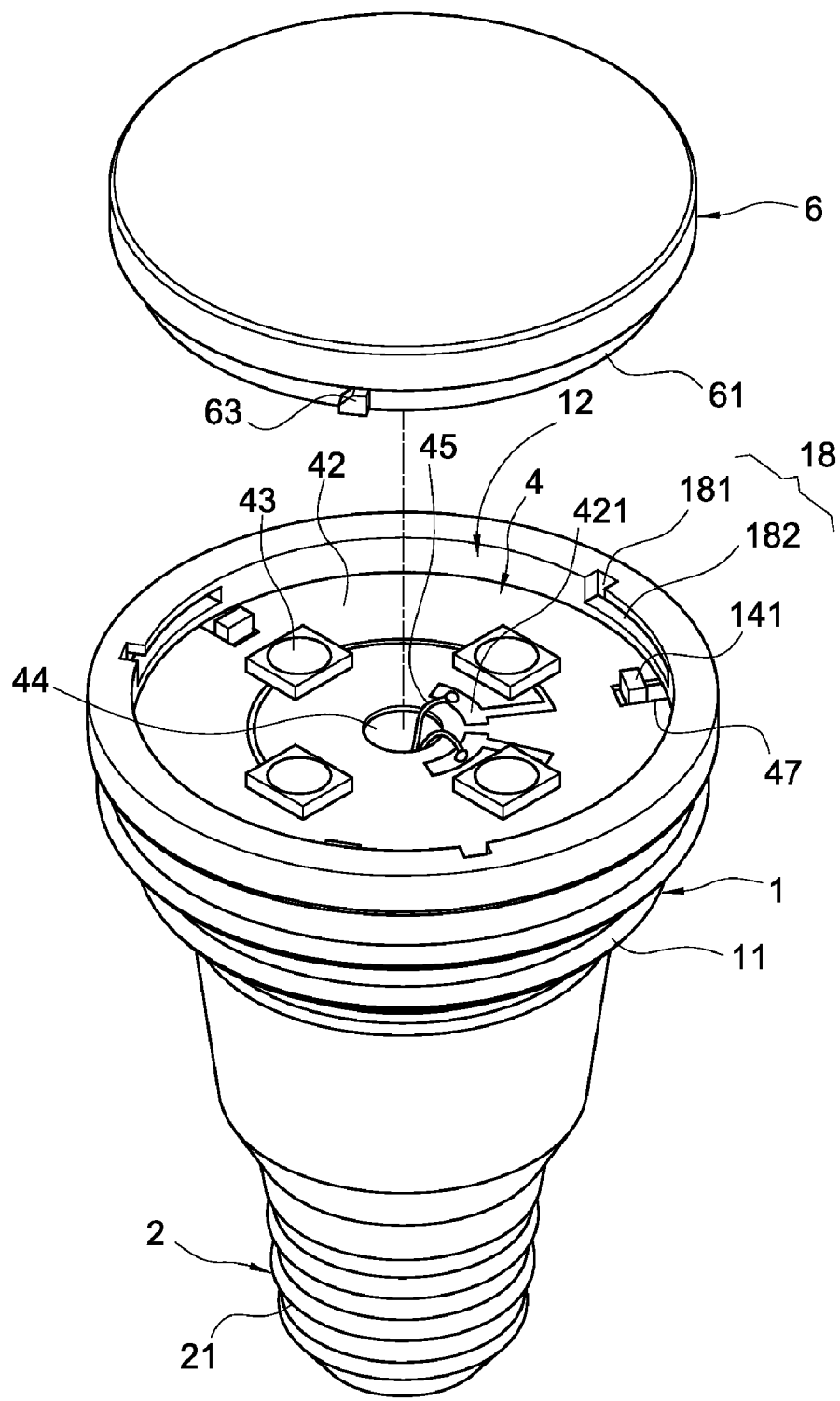
FIGS. 3B to 3E show schematically the connection action of the shade, light unit slice and the heat dissipation housing of FIG. 3A.
Figure 3C:
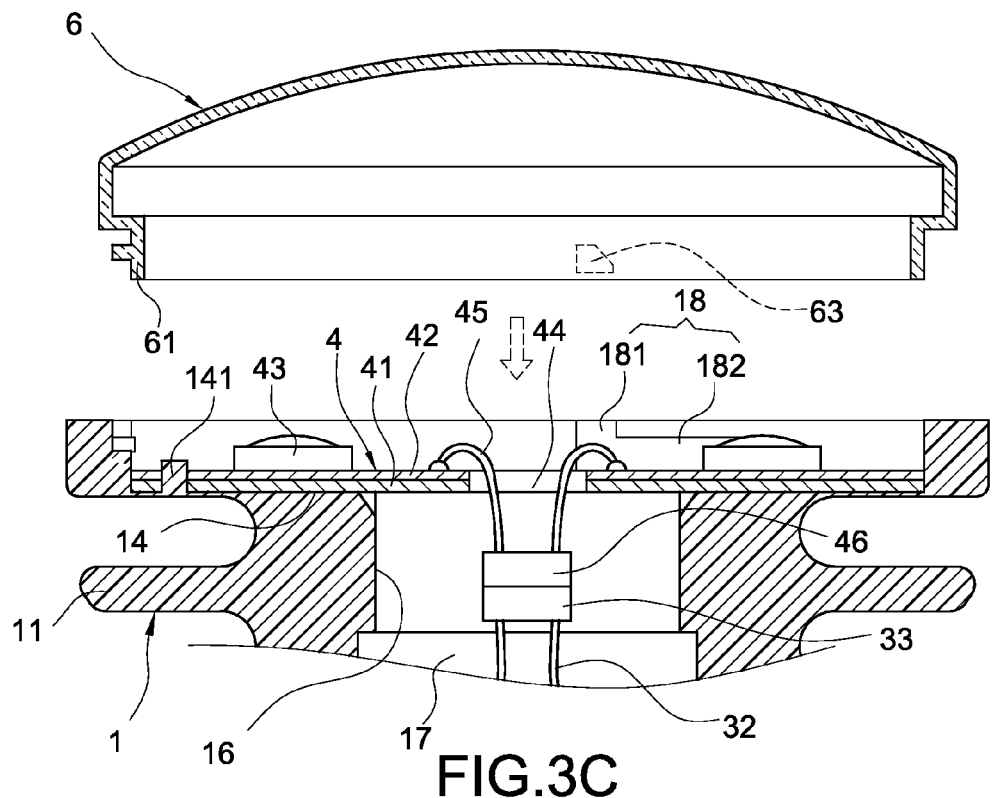
Figure 3D:
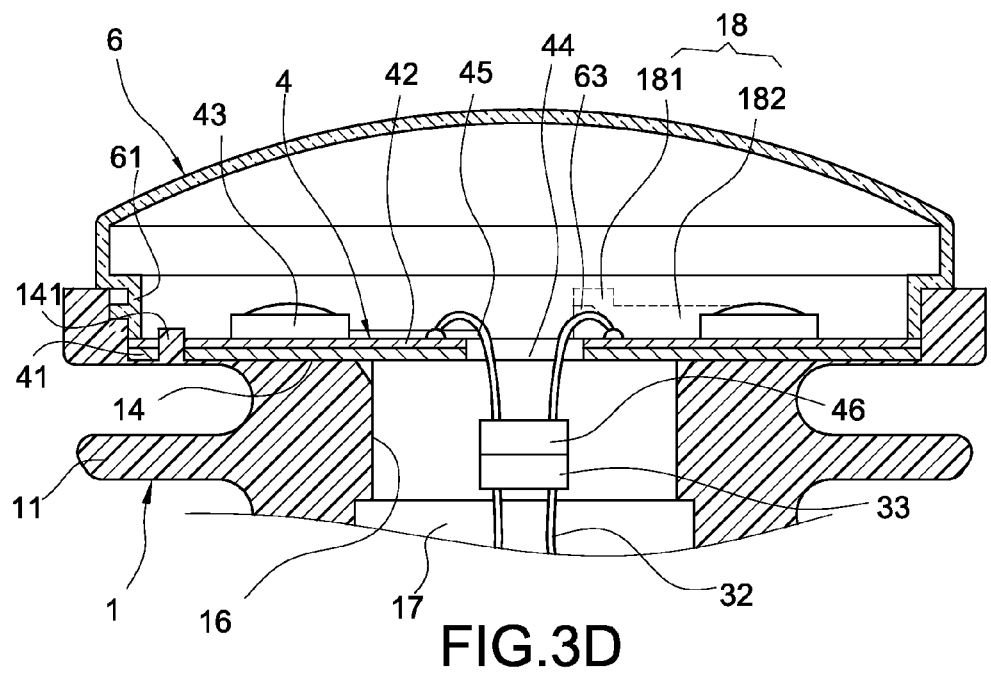
Figure 3E:
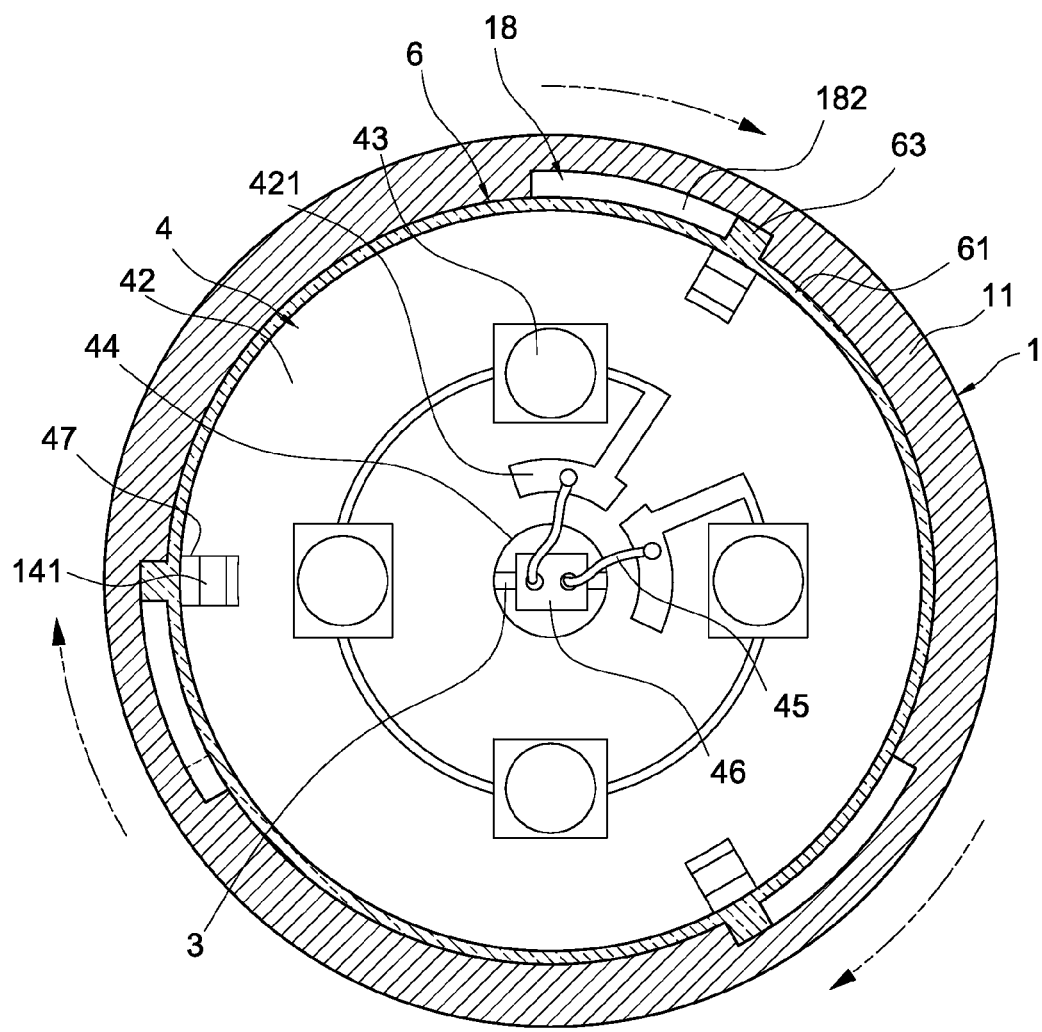

Please refer to FIG. 3A, which shows an exploded view of LED lamp according to a third preferred embodiment of the present invention. As shown in the figure, except that a plurality of notches 47 are provided on the substrate 41, a plurality of position blocks 141 provided on the spacer 14 of the heat dissipation housing 1 to have a gap 19 with the inner surface of the opening 12 in this preferred embodiment, the other portions are substantially the same to that of FIG. 2A.

Please refer to FIGS. 3B to 3E, which show schematically the connection action of the shade 6, light unit slice 4 and the heat dissipation housing 1 of FIG. 3A. As shown in the figures, after assembling the metal connector 2, the driver circuit board 3, the light unit slice 4 and the pad 5 with the heat dissipation housing 1, the connecting portion 61 of the shade 6 is first held in the gap 19 formed between the position blocks 141 and the inner surface of the opening 12, while the wedges 63 of the shade 6 are inserted exactly into the inserting ports 181 of the slots 18, the shade 6 is rotated, and the wedges 63 slide along the slides 182 to connect the shade 6 with the opening 12 of the heat dissipation housing 1 rapidly and easily.

Figure 4A:
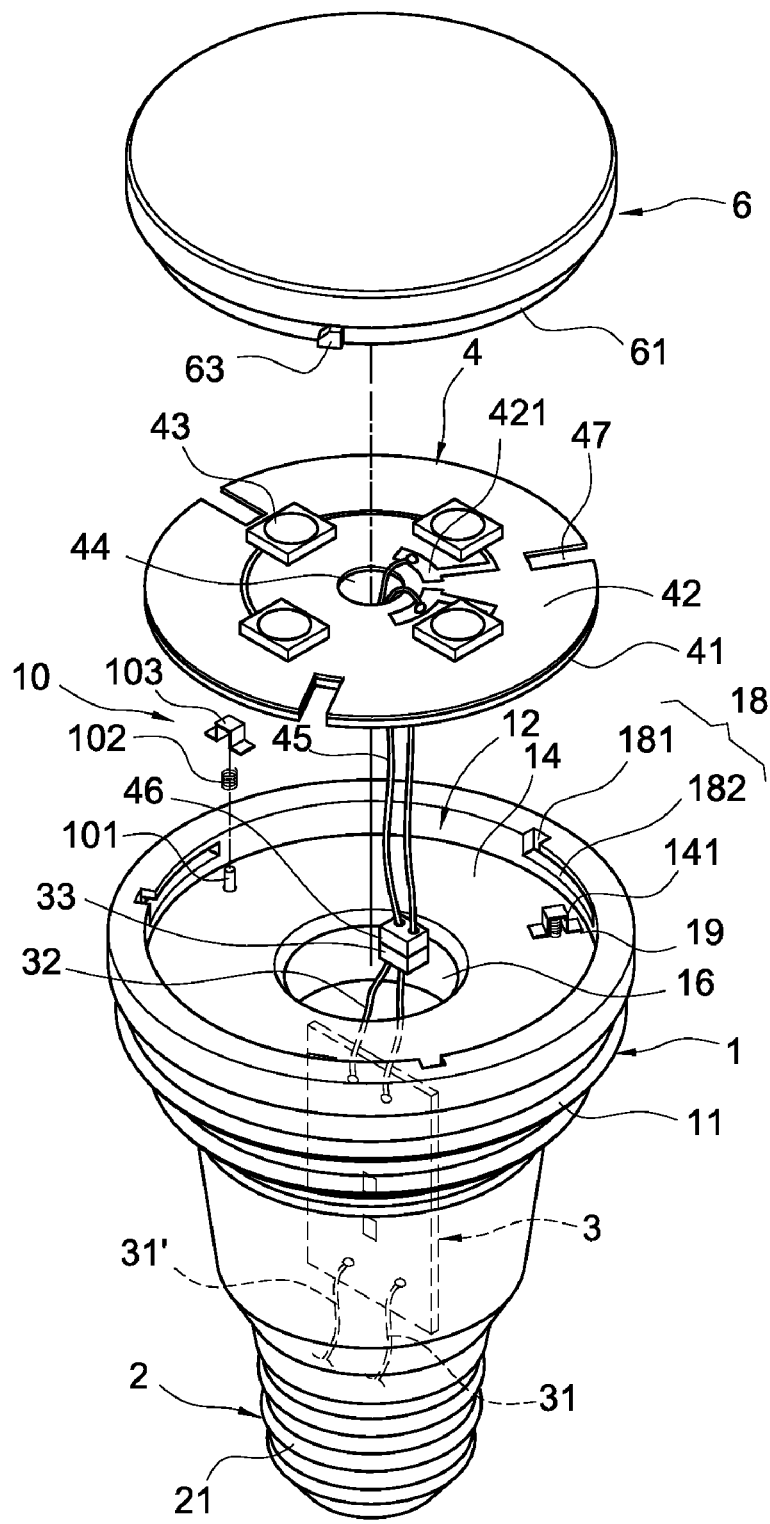
FIG. 4A shows an exploded view of LED lamp according to a fourth preferred embodiment of the present invention.
Figure 4B:
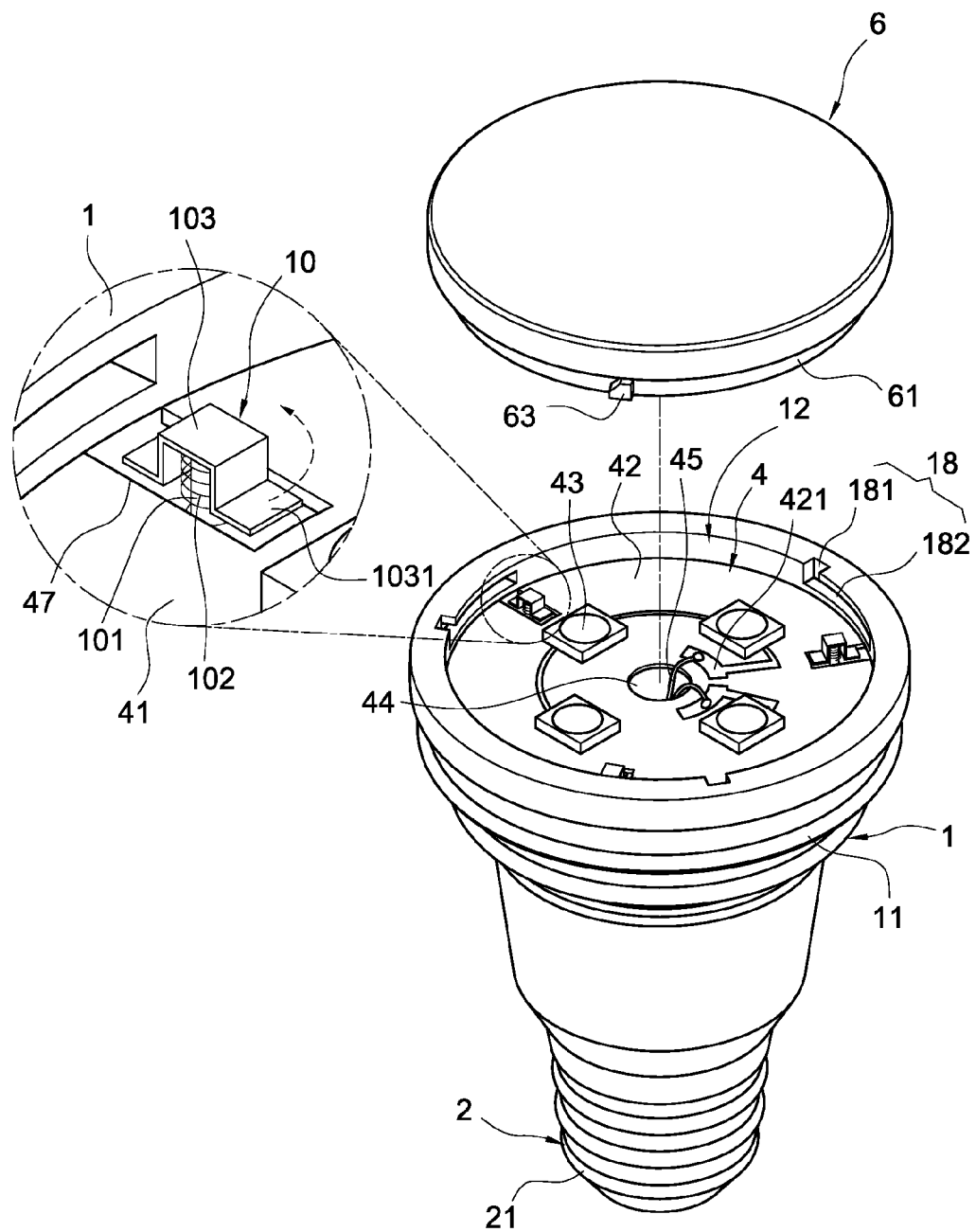
FIGS. 4B to 4F show schematically the connection action of the shade, the light unit slice and the heat dissipation housing of FIG. 4A.
Figure 4C:
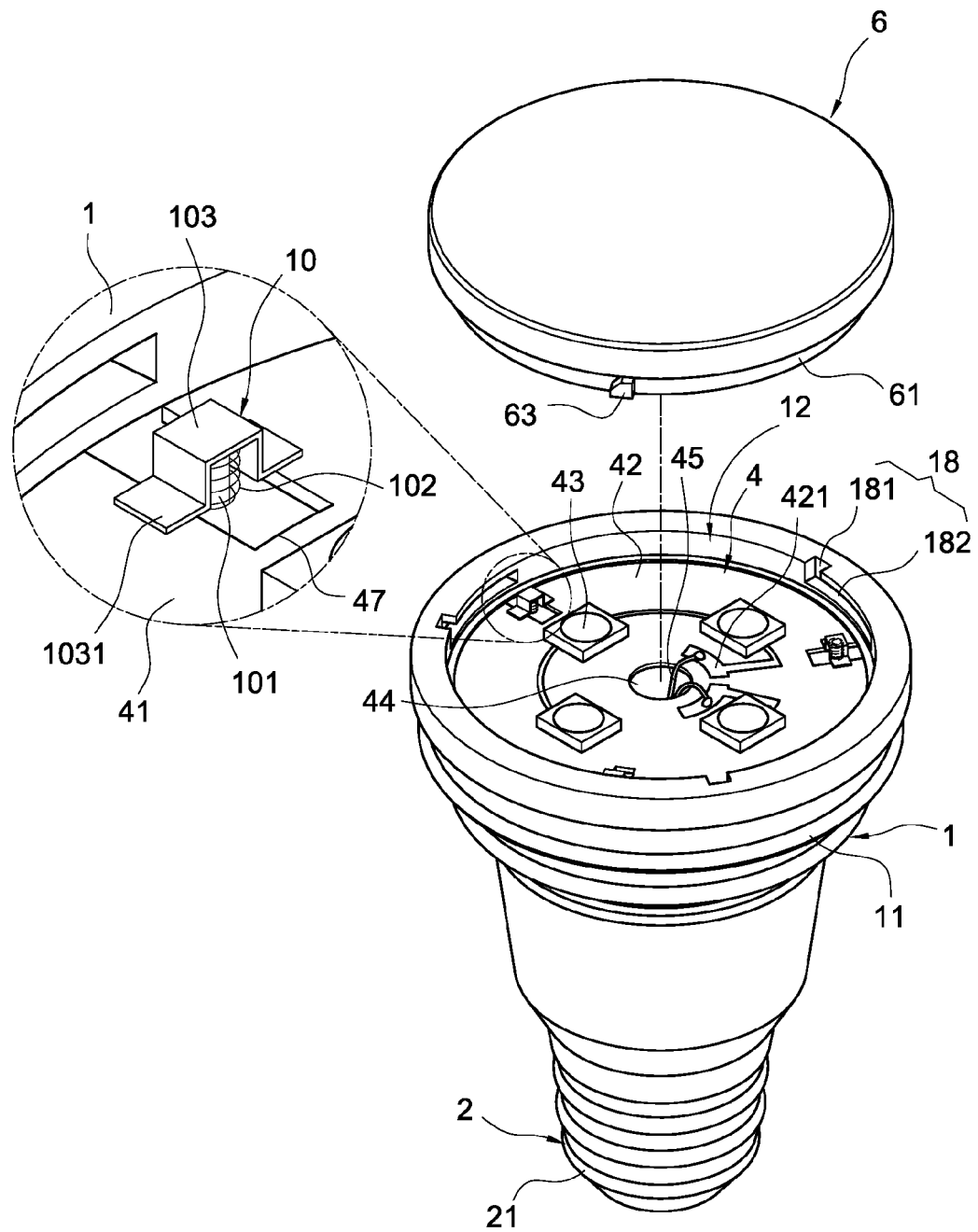
Figure 4D:
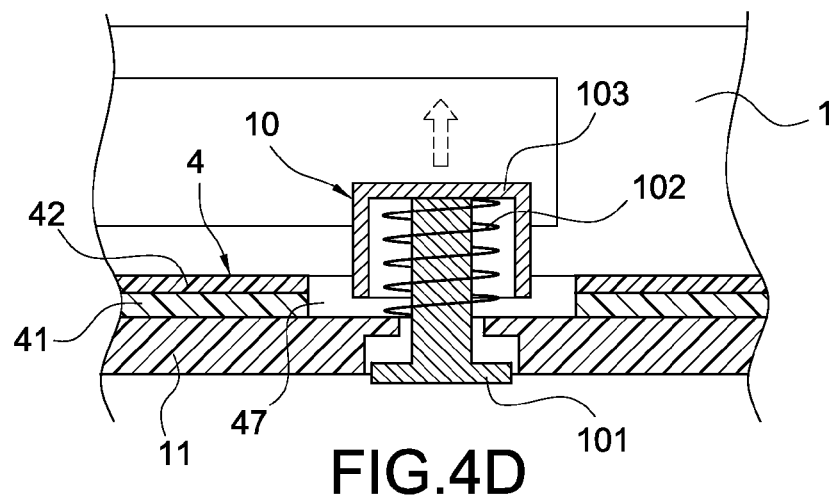
Figure 4E:
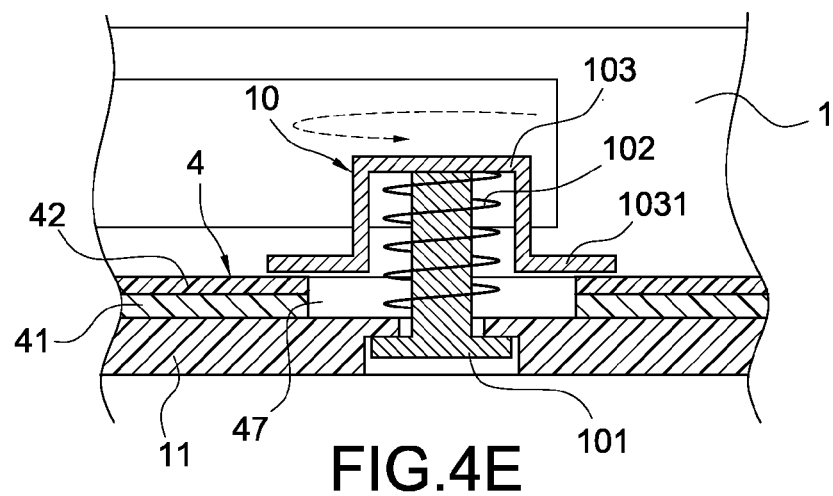
Figure 4F:
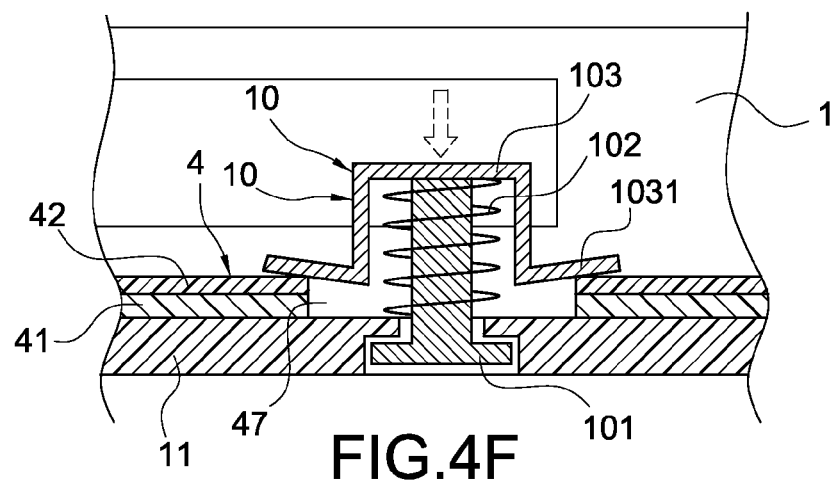

Please refer to FIG. 4A, which shows an exploded view of LED lamp according to a fourth preferred embodiment of the present invention. As shown in the figure, position blocks 141 provided on the spacer 14 of the heat dissipation housing 1 may be changed into a resilient press mechanism 10. The press mechanism 10 has a post 101 disposed on the spacer 14, a spring 102 hinged in the post 101, and a pressing piece 103. The pressing piece 103 has a square cross section, and two wings 1031 are slightly raised. Also, the notch 47 provided on the substrate 41 has an enlarged perimeter to cooperate with the design of changing direction of the press mechanism 10.

Please refer to FIGS. 4B to 4F, which show schematically the connection action of the shade 6, the light unit slice 4 and the heat dissipation housing 1 of FIG. 4A. As shown in the figures, after assembling the metal connector 2 and the driver circuit board 3 with the heat dissipation housing 1, the direction of pressing piece 103 is changed until the two wings 1031 of pressing piece 103 have the same direction with the notches 47, the notches 47 is aligned with the pressing piece 103, the substrate 41 is provided on the spacer 14, and the pressing piece 103 is rotated to press the two wings 1031 of the pressing piece 103 on the substrate 41. Next, the connecting portion 61 of the shade 6 is first held in the gap 19 formed between the press mechanism 10 and the inner surface of the opening 12, while the wedge 63 of the shade 6 is inserted exactly into the inserting port 181 of the slot 18, the shade 6 is rotated, and the wedge 63 slides along the slide 182 to connect the shade 6 with the opening 12 of the heat dissipation housing 1 rapidly and easily.

Figure 5A:
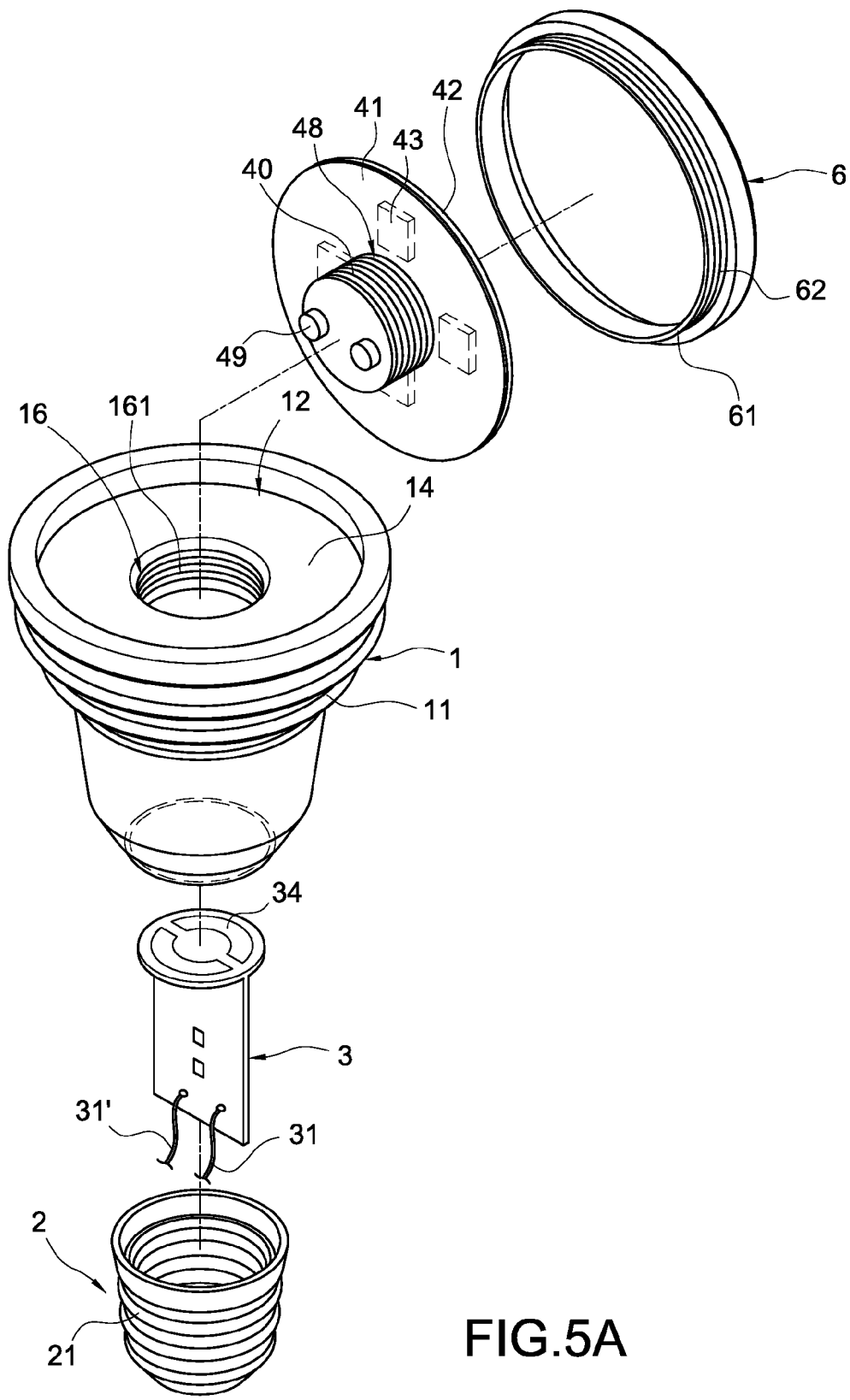
FIG. 5A shows an exploded view of LED lamp according to a fifth preferred embodiment of the present invention.

Please refer to FIG. 5A, which shows an exploded view of LED lamp according to a fifth preferred embodiment of the present invention. As shown in the figure, except that a hollow cylinder 48 communicating with the through hole 44 are provided on the other surface of the substrate 41, which has two electrode terminals 49 on the bottom and a screw connection part 40 on the outer surface. The two electrode terminals 49 are connected with the two power source wires 45 of the substrate 41. Further, the hole 16 of the heat dissipation housing 1 has screw thread face 161 on the inner surface to screw with screw connection part 40 of the cylinder 48, the other portions are substantially the same to that of FIG. 2A.

Figure 5B:
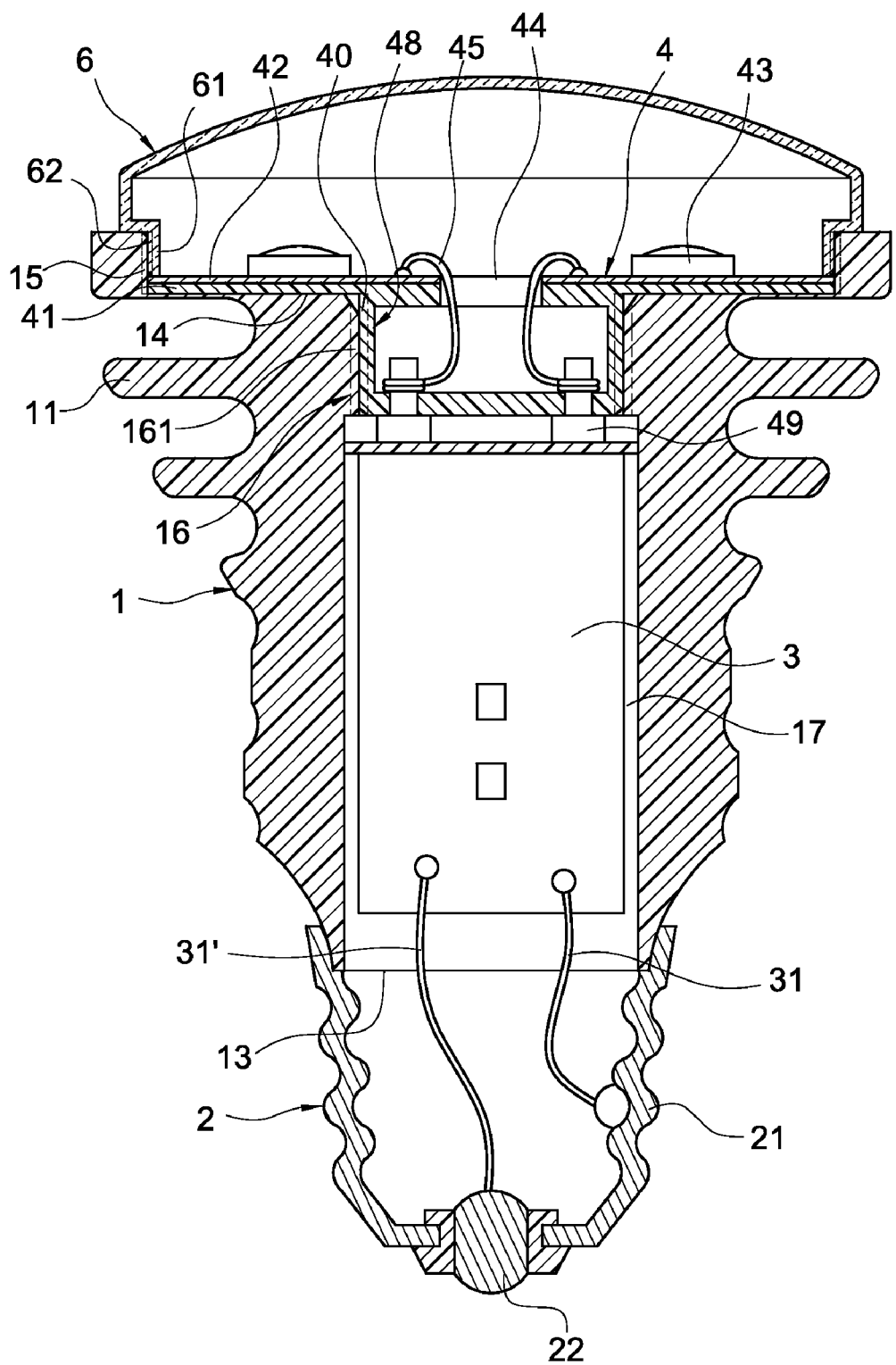
FIG. 5B shows schematically the connection action of the shade, the light unit slice and the heat dissipation housing of FIG. 5A.

Please refer to FIG. 5B, which shows schematically the connection action of the shade 6, the light unit slice 4 and the heat dissipation housing 1 of FIG. 5A. As shown in the figures, after assembling the metal connector 2 and the driver circuit board 3 with the heat dissipation housing 1, the post 48 of the substrate 41 is aligned with the hole 16 of the heat dissipation housing 1, the screw connection part 40 of the post 48 is screwed with the screw thread face 161 of the hole 16, while the two electrode terminals 49 are contacted with the two conductive terminals 34 of the driver circuit board 3, and the shade 6 is screwed with the opening 12 of the heat dissipation housing 1. When the external power is inputted to light the light emitting elements 43 through the metal connector 2 transmitting to the two power input wires 31, 31' and driving the driver circuit board 3.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

The invention claimed is:

1. An LED lamp with replaceable light unit comprising:
    a heat dissipation housing having an opening at one end and a joint portion at another end, the opening inside having a spacer and screw thread portion, and the spacer having a hole with screw thread face on the inner surface; the heat dissipation housing inside having a chamber to communicate with the hole and the joint portion;
    a metal connector disposed to the joint portion, the metal connector having a screw connection portion and a lamp head connected to thereto in insulation;
    a driver circuit board disposed inside the chamber, driver circuit board having two power input wires and two power output wires, one of the power input wire electrically connected to the screw connection portion, and the other power input wire electrically connected to the lamp head;
    a light unit slice having a substrate, the substrate having a circuit board disposed on a surface thereof and insulated thereto, electrically connecting to at least one light emitting element and further including two welding areas for electrically connecting to two power source wires; a hollow cylinder being provided on the other surface of the substrate, the hollow cylinder having two electrode terminals for contacting with the two conductive terminals on the bottom and a screw connection part for screwing with the screw thread face of the hole on the outer surface; the two electrode terminals being electrically connected to two power source wires of the substrate;
    a shade disposed on the opening, the shade having a connecting portion thereon, and the connecting portion having a screw thread face on its outer surface for screwing to the screw thread portion of the opening.

2. The LED lamp with replaceable light unit of claim 1 wherein the heat dissipation housing is made of metal material and formed to be a cup-shape, the heat dissipation housing having a plurality of annular fins on the outer surface.

3. The LED lamp with replaceable light unit of claim 1 wherein the substrate is made of aluminum to have a slice shape, a through hole is disposed on the substrate and the circuit board, through which the two power source wires pass, and a joint is provided to connect two power source wires and insert into the joint of the two power output wires of the driver circuit board so that the driver circuit board can transmit a driving signal to the light unit slice for lighting the light emitting elements, wherein the light emitting elements are light emitting diodes.

4. The LED lamp with replaceable light unit of claim 1 wherein the shade is made of transparent plastic material.

* * * * *